Jan. 2, 1934.　　　　K. S. CLAPP　　　　1,942,276
AUTOMOBILE JACK
Filed July 20, 1932
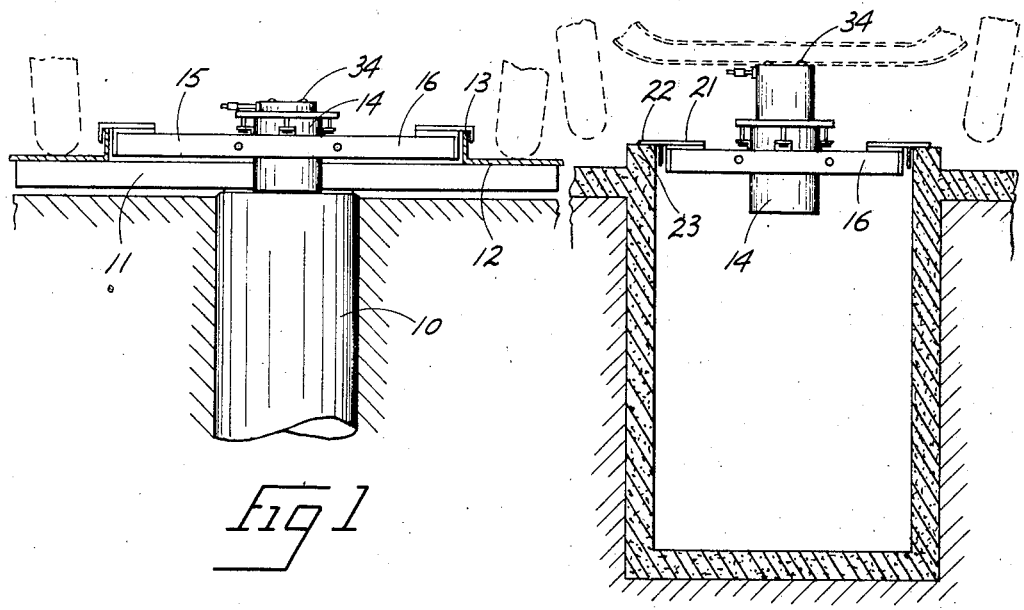
*Fig 1*　　*Fig 2*
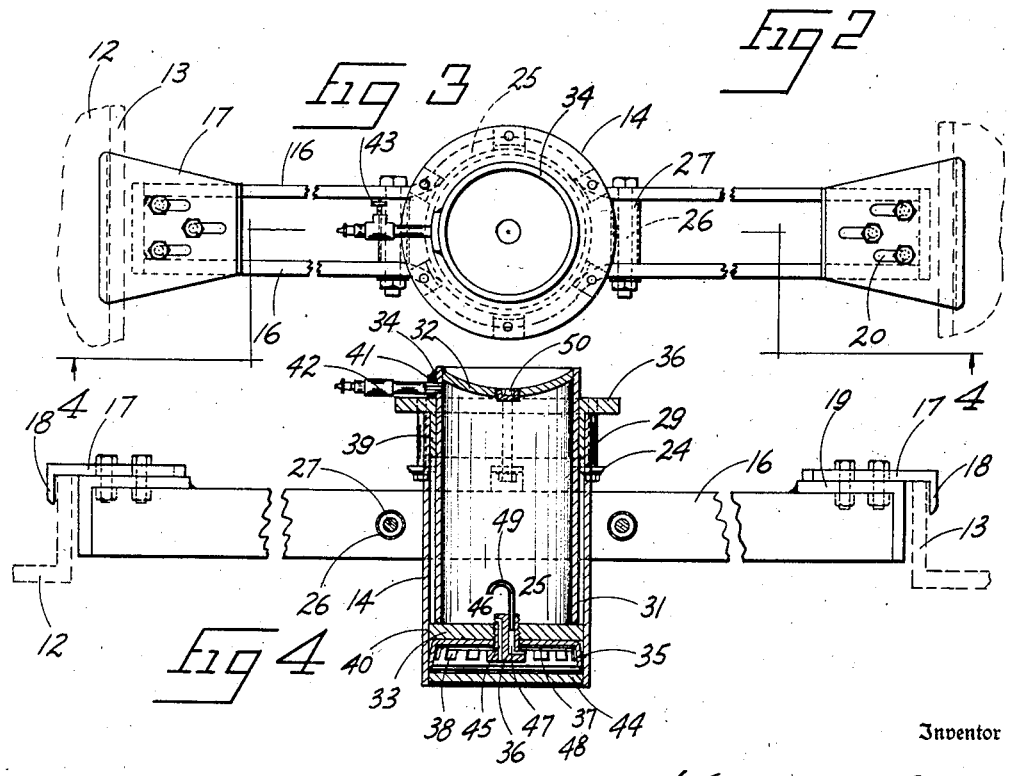
*Fig 3*
*Fig 4*
Inventor
By Kenneth S. Clapp Patented Jan. 2, 1934

1,942,276

UNITED STATES PATENT OFFICE 1,942,276

AUTOMOBILE JACK

Kenneth S. Clapp, Cleveland, Ohio

Application July 20, 1932. Serial No. 623,596

3 Claims. (Cl. 254—89)

This invention relates broadly to elevating mechanisms and more specifically to an improved automobile jack adapted for coordinative application upon a lubricating stand or hydraulic lift.

The lubricating and service equipment for automobiles comprises generally three types or classes of service units: lifts of the type adapted to support a car driven upon the runways thereof, lifts formed to support a car upon its axle or chassis members and stands or pits wherein the car is positioned over a guarded excavation or upon a stationary structure. In servicing a car for lubrication or tire change upon each of these devices certain difficulties have been encountered, for instance, in the so-called "free-wheel" type of lift when the car is supported upon its axle great care must be exercised in placing and securing the car upon the rails of the lift in order to avoid accidental dislodgment thereof and the consequent damage to the vehicle or injury to the attendant. In equipment wherein the weight of the car is borne upon its wheels difficulty is encountered in lubricating certain portions of the chassis and running gear and obviously tire changes are impossible.

The mechanism embodying the present invention is constructed for application upon lubricating service equipment of the type wherein the weight of the car is borne upon its wheels, but contemplates the advantageous freedom of movement of the wheels and steering mechanism or propeller shaft, facilitates tire changes and moreover eliminates the hazard of accidental displacement of the car upon the rack.

One of the objects of this invention is to provide a lifting jack which is adapted for use upon a hydraulic lift, pit or similar structure and which is susceptible of being readily positioned thereon to accommodate its allocation with respect to the position of the axle of the car placed thereon.

Another object of the invention is to provide a fluid operated jack constructed for application upon an automobile lift which is capable of elevating the forward or rear portion of the car while placed thereon irrespective of the height to which the lift may have been adjusted and independent of any movement thereof.

A further object of this invention is to provide a supporting mechanism for a lifting jack or hoist, the engaging members thereof being readily adjustable to accommodate its application and retention upon the guard rails of a lubricating pit, lift or similar automobile service structure.

Another object of the invention is to provide an automobile jack supporting structure embodying instrumentalities formed for operative engagement with the guard rails of a lubricating lift and coordinated therewith to eliminate the hazard of accidental dislodgment of the car while positioned thereon.

Another object of the invention is to construct a jack for automobiles which is relatively light in weight, sturdy of structure, economic of manufacture and readily operable by the untutored mechanic.

Other objects and advantages more or less ancillary to the foregoing and the manner in which all the various objects are realized will appear in the following description which, considered in connection with the accompanying drawing, sets forth the preferred embodiment of the invention.

In the drawing—

Figure 1 is a transverse sectional view of an automobile lubricating lift and illustrating the jack constituting the present invention applied thereto.

Figure 2 is a transverse sectional view of a pit illustrating the automobile jack mounted thereon and shown in its operative or elevated position.

Figure 3 is a plan view of the automobile jack.

Figure 4 is a vertical sectional view taken on a plane indicated by the line 4—4 in Figure 3.

Referring to the structure illustrated in Figure 1, the automobile lift embodies generally a hydraulic ram 10 of the usual construction having transverse frame members 11 and longitudinally extended track or runway members 12 secured thereon. The track is formed of structural steel channels or, as shown, angle irons having the flanged portions 13 disposed in vertical relation with the base to provide guide rails or guards for the wheels of the vehicle as it is driven upon the lift.

The jack embodies a cylinder 14 upon the body of which there is secured a supporting frame 15 which comprises spaced arms 16 the length thereof being slightly less than the distance between the flange portions of the track members 12. The ends of the arms 16 are provided with bearing plates 17 having laterally widened end portions formed with depending ribs 18 adapted to overlap the flanges 13 to prevent accidental dislodgment of the jack from the runways. The plates 17 are bolted to clips 19 welded or otherwise suitably affixed to the arms 16 and may be transversely adjusted through the slots 20 to accommodate variations in the spacing of the track members 12.

When the jack is employed upon a pit, as illustrated in Figure 2, the supporting plates 21 are formed with extended end portions 22 which engage the upper surface of the guard curbing 23 and transverse movement of the jack is limited by depending ribs 22 which are suitably spaced or configured with respect to the form of the curb to provide an adequate support for the supporting frame of the jack.

The arms 16 are formed with centrally disposed arcuate sections 25 configured in lineation with the cylinder and held in intimate engagement therewith by draw bolts 26 mounted in apertures in the arms adjacent their arcuate portions. Spacing collars or sleeves 27 are mounted upon the bolts 26 intermediate the arms and are provided to avoid distortion of the cylinder upon undue application of compressive effort through the bolts.

The cylinder or casing 14 of the jack is provided with a plurality of angle clips 24 welded upon the periphery of the cylinder intermediate its length and at points equidistant from its upper end. These clips or lugs engage the upper face of the arms 16 and facilitate the support of the jack upon the supporting arm structure. The flanged portions 28 of the clips 24 are drilled to receive studs 29 screw threaded into a cylinder cover plate 30 mounted upon the upper end of the cylinder.

Within the cylinder 16 there is a piston or ram 31 having a concavo-convex top plate 32 and a bottom closure disc 33. The top plate is formed with a plurality of vertically disposed lugs 34 suitably spaced to receive an automobile axle therebetween upon operative application of the jack or hoist. The concave face of the top plate is constructed to facilitate its engagement with the rear axle housing when the jack is employed to elevate the rear portion of an automobile.

Upon the lower face of the disc 33 there is a leather cup 35 retained by a cap screw 36 and a washer or plate 37 which is of substantially the same diameter as the head of the cup 35. The side walls of the cup are retained in intimate engagement with the walls of the cylinder 14 by a spreader plate 38 which embodies a disc portion supported by the screw 36 and a plurality of resilient fingers which engage the inner wall of the cup flange and wedge the same outwardly.

The piston 31 is slightly less in diameter than the bore of the cylinder and is guided therein by the flanged portion of the cup leather and by a bushing 39 which is pressed in the cylinder 14 adjacent its top and retained therein by its abutting engagement with the cover plate 30. The disc 33 is circumferentially larger than the piston 31 forming a ledge or shoulder 40 adapted to engage the inner end of the bushing 39 and thus limit the upward movement of the ram during the operation thereof. The downward movement of the piston is arrested by the engagement of a boss 41 adjacent the upper end of the piston with the cover plate 30. The boss 41 is drilled and tapped to receive the stem of an air valve 42 which is of conventional construction being adapted to admit fluid under pressure and retain the same until a by-pass valve 43 formed in a branch member of the stem is opened to atmosphere. Downward movement of the piston may likewise be limited by the engagement of the head of the cap screw 36 with the cylinder end plate 44. In either case the cylindrical body or flanged portion of the cup leather will be maintained in spaced relation to the cylinder end plate and the form of the leather and consequent sealing engagement with the cylinder are thus preserved.

The cap screw 36 is constructed with a relatively small canal 45 which extends longitudinally from the headed end of the screw to a cross bore arranged for communication with the interior of the piston. A second passage 47, somewhat larger than the canal 45, is also formed in the cap screw 36. This passage intersects a cross bore 48 which communicates with the portion of the cylinder subjacent the cup leather 36. The inner end of the passage 47 is provided with a down tube 49, the free end thereof being looped downwardly to face the disc or piston closure plate 33.

The piston in the structure heretofore described may be actuated entirely by the application of compressed air or by the introduction of a compressed fluid upon a body of liquid, such as oil which may be introduced within the piston through the screw plug 50 in the top plate 32.

In operation, after an automobile is driven upon the runways of a lubricating lift or pit the jack is positioned beneath either axle of the car, the bearing plates 17 having been previously adjusted to accommodate the free sliding movement of the arms upon the flanges 13 or guard curbing 23. Compressed air is then admitted to the piston through the valve 42, the preferable expedient to facilitate this operation being the valve coupling customarily employed in the inflation of pneumatic tires. As the compressed fluid enters the interior of the piston it will flow through the passages 45 and 47 into the cylinder chamber beneath the piston cup leather and cause the ram to be elevated until the shouldered plate 33 engages the guide bushing 39. When a non-compressible fluid is employed the piston is partially filled with oil or a similar liquid of the character customarily used in hydraulic rams.

In operation compressed air admitted through the valve 42 upon the body of the liquid causes the oil to be driven through the passage 45 and into the chamber beneath the seal or cup leather 35, the entrapped air therein being displaced through the opening 47 and tube or standpipe 49.

In the application of the jack upon a lubricating stand, the automobile is driven upon the runways in the usual manner and the jack is then slidably adjusted in position beneath the front or rear axle so that engagement of the piston therewith may be effected upon the elevation of the ram. Compressed air is next introduced through the valve 42 into the piston chamber and from thence the fluid will flow into the cylinder through the opening 45 causing the ram to be elevated to its maximum extended position. When it is desired to lower the vehicle from its elevated position the valve 43 is opened and the compressed fluid is permitted to escape to atmosphere. As the fluid pressure drops within the piston the weight of the vehicle will effect the displacement of the fluid within the cylinder 14 and thus cause the retraction of the piston. When the wheels of the vehicle are lifted from the runway the lubrication of the chassis may be executed in a more expeditious and effective manner, for instance, certain grease fittings located upon the inner face of the front wheel hubs may be reached only when the wheels are turned at an acute angle and rotated to an accessible position and further elevation of the rear axle will facilitate the revolution of the drive shaft and an accessible disposition of the grease couplings on the universal joints. Moreover, a tire change may be more readily made with the jack constituting the present invention than with other instrumentalities now commercially known and used, since the application thereof necessitates less manipulation, less dexterity of operation and may be operated with greater expedition.

Although the foregoing description is necessarily of a detailed character, in order that the invention may be completely set forth, it is to be understood that the specific terminology is not intended to be restrictive or confining, and that various rearrangements of parts and modifications of structural detail may be resorted to without departing from the scope or spirit of the invention as herein claimed.

I claim:

1. In combination with an automobile lubricating lift having parallel flanged guide rails, a lifting jack comprising a hydraulic ram, arms of equal length secured to the cylinder of said ram intermediate its length and extending laterally therefrom, plates adjustably mounted upon the free ends of each of said arms, flanges formed in the outer ends of said plates adapted to overlie the flanges of the lift guide rails for preventing lateral dislodgment of the lifting jack relative to the guide rails, the length of the portion of the body of the ram which depends below the arms being less than the distance of the lubricating lift guide rails from the floor when the lift is in its lowered position.

2. In combination with a vertically adjustable lubricating lift for automobiles having parallel flanged guide rails and supporting members thereunder which dispose the guide rails in spaced relation to the floor when the lift is adjusted to its lowered position, a jack comprising a cylinder, a piston reciprocable therein, arms of equal length secured to the body of said cylinder intermediate its length, flanged plates adjustably mounted upon the ends of said arms, the flanged portions thereof being disposed to overlie said guide rail flanges and preventing lateral movement of the jack relative thereto, the length of the body of the cylinder extending below the surface of the said guide rails being less than the distance of said guide rails from the floor when the lubricating lift is adjusted in its lowered position.

3. In combination with an automobile lubricating stand of the vertical reciprocating type having parallel flanged guide rails for receiving the wheels of a vehicle thereon, a fluid operated ram comprising a cylinder, a reciprocating piston therein, a frame secured to the body of said cylinder intermediate its ends, said frame comprising spaced parallel bars of equal length and the plates secured to the end portions thereof, flanged plates mounted upon said tie plates and retained thereon by bolts extending through the tie plates and slotted openings in said flanged plates, the flanged plates being adapted to engage the vertical flanges of the lubricating stand guide rails and being adjustable thereto to facilitate lateral centering of the cylinder therewith, the said frame being attached to the cylinder at a point to prevent the end wall of the cylinder from striking the floor when the lubricating stand is reciprocated to its lowered position.

KENNETH S. CLAPP.